(12) United States Patent
Hopkins et al.

(10) Patent No.: US 12,298,793 B2
(45) Date of Patent: May 13, 2025

(54) WIDE-RANGE, PRECISION SUPPLY CIRCUIT

(71) Applicant: Opteon Corporation, Hudson, MA (US)

(72) Inventors: T. Eric Hopkins, Wellesley, MA (US); Timothy N. Schaeffer, Somerville, MA (US); Jeffrey Cho, Northborough, MA (US)

(73) Assignee: Opteon Corporation

( * ) Notice: Subject to any disclaimer, the term of this patent is extended or adjusted under 35 U.S.C. 154(b) by 0 days.

(21) Appl. No.: 18/941,893

(22) Filed: Nov. 8, 2024

(65) Prior Publication Data

US 2025/0068201 A1    Feb. 27, 2025

Related U.S. Application Data

(63) Continuation of application No. PCT/US2023/066855, filed on May 10, 2023.

(60) Provisional application No. 63/343,058, filed on May 17, 2022, provisional application No. 63/340,300, filed on May 10, 2022.

(51) Int. Cl.
*G05F 1/56* (2006.01)
*H04N 23/51* (2023.01)
*H04N 25/709* (2023.01)

(52) U.S. Cl.
CPC ............... *G05F 1/56* (2013.01); *H04N 23/51* (2023.01); *H04N 25/709* (2023.01)

(58) Field of Classification Search
CPC ....... H04N 25/709; H04N 523/51; G05F 1/56
See application file for complete search history.

(56) References Cited

U.S. PATENT DOCUMENTS

| | | | |
|---|---|---|---|
| 2003/0095406 A1 | 5/2003 | Lebens et al. | |
| 2014/0103890 A1* | 4/2014 | Naidu | G05F 1/10 323/269 |
| 2014/0266118 A1* | 9/2014 | Chern | H02M 3/156 323/283 |
| 2015/0077076 A1* | 3/2015 | Bhattad | G05F 1/56 323/280 |
| 2019/0050011 A1* | 2/2019 | Fujimoto | G05F 1/573 |
| 2019/0286180 A1 | 9/2019 | Sakaguchi et al. | |
| 2021/0064071 A1 | 3/2021 | Kadowaki | |
| 2021/0373586 A1* | 12/2021 | Takano | G06F 1/3206 |

OTHER PUBLICATIONS

International Search Report and Written Opinion in International App. No. PCT/US2023/066855 mailed Dec. 19, 2023, 18 pages.

* cited by examiner

*Primary Examiner* — Amy R Hsu
(74) *Attorney, Agent, or Firm* — Smith Baluch LLP

(57) ABSTRACT

A wide current-and-voltage-range, precision supply circuit to conduct current (pulsed or continuous) having precisely-controlled current levels through a load is described. The supply circuit includes selectable current-sensing resistors in a feedback loop that controls current output to accommodate a wide range of currents provided to the load. The circuit can include a programmable output voltage that is applied to the load. The circuit can provide sensed voltage information from a single sensing node in the supply circuit to enable protection of the load and of power transistor(s) that conduct current through the load.

31 Claims, 5 Drawing Sheets

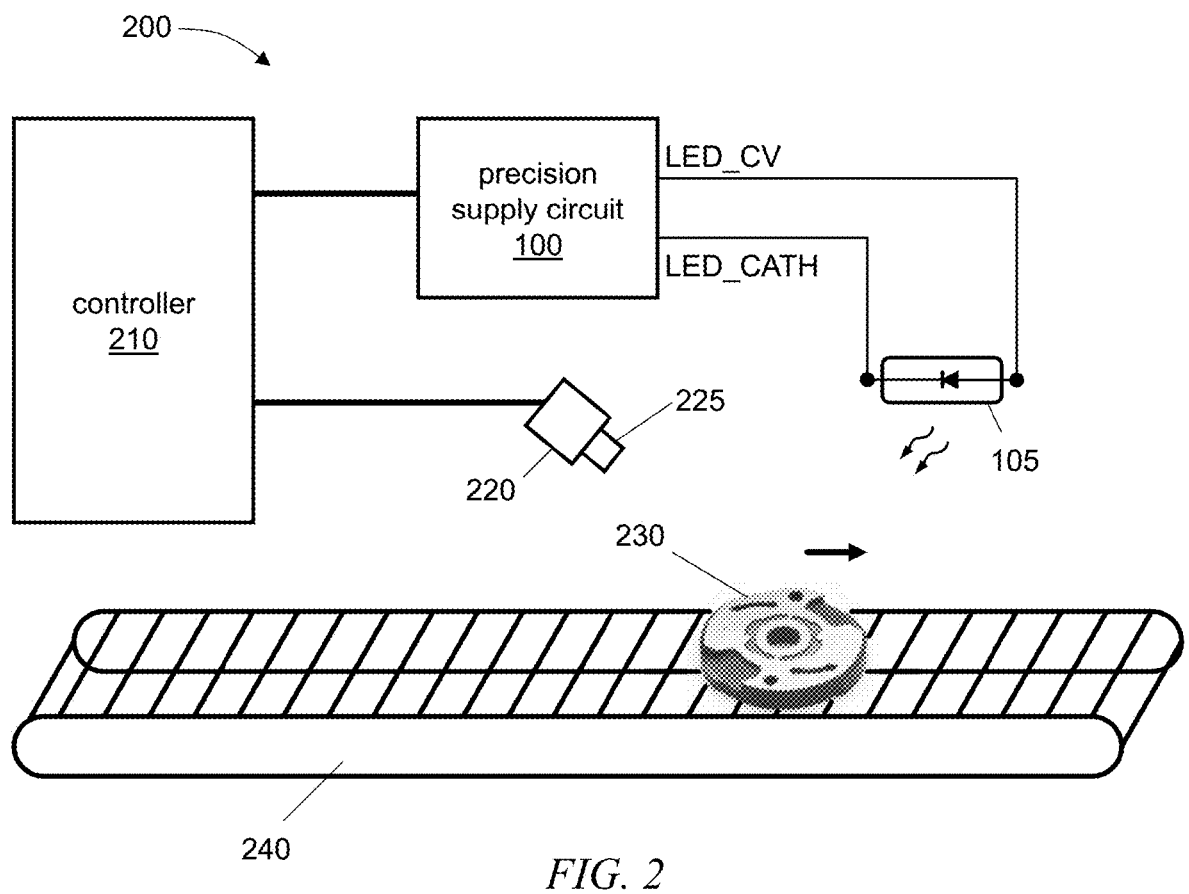
FIG. 2
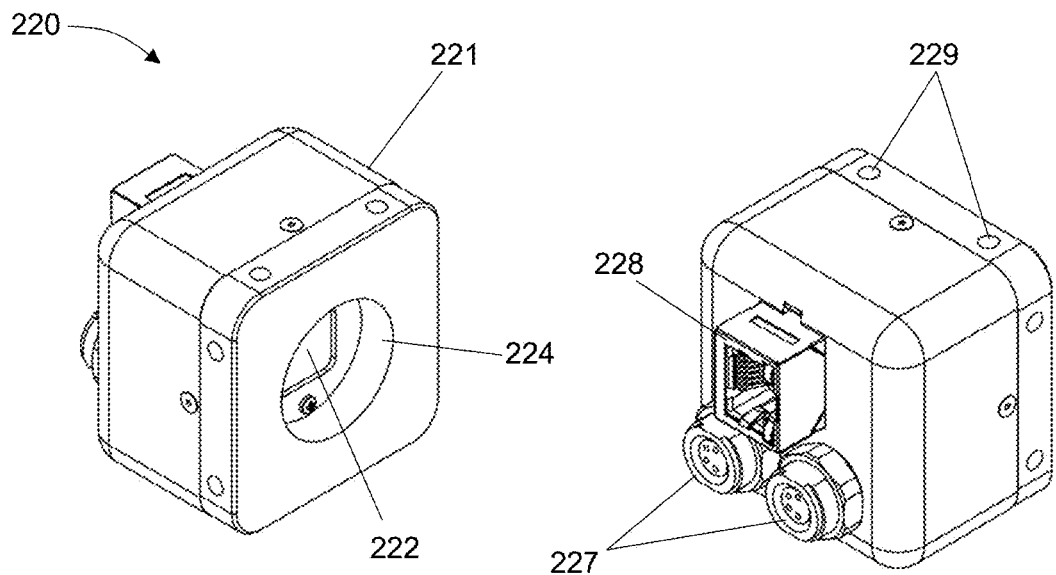
FIG. 3A
FIG. 3B

WIDE-RANGE, PRECISION SUPPLY CIRCUIT

CROSS-REFERENCE TO RELATED APPLICATION

This application is a bypass continuation of International Application No. PCT/US2023/066855, titled "Wide-Range, Precision Supply Circuit," filed on May 10, 2023, which claims the priority benefit, under 35 U.S.C. 119 (e), of U.S. Application No. 63/340,300, titled "High Dynamic Range LED Control Systems and Methods," filed on May 10, 2022 and of U.S. Application No. 63/343,058, titled "High Dynamic Range LED Control Systems and Methods," filed on May 17, 2022, which applications are incorporated herein by reference in their entirety.

BACKGROUND

Modern automated control systems can include a large number of controlled and/or monitored devices (e.g., sensors, cameras, artificial lighting, counters, motors) and one or more controllers (e.g., microprocessors or microcontrollers). The controller(s) can receive and process data from monitored devices and issue commands to operate controlled devices based, at least in part, on the data received. Such automated control systems often are implemented in dynamic environments (e.g., automated factory assembly lines including multiple inspection stations and utilizing machine vision techniques) where conditions in the environment change frequently, causing changes in signals provided by monitored devices and responsive changes in control signals output by the controller(s). Common components in these dynamic environments include controllable cameras and artificial lighting to facilitate effective imaging by the cameras. Conventional examples of such artificial lighting include, but are not limited to, LED-based lighting systems.

SUMMARY

Described herein are circuitry, apparatus, and methods to precisely control current (over a large dynamic range) and program voltage (over a large range) delivered to a load, such as an LED lamp or other current-driven device. Such LED lamps can be used to illuminate targets for machine vision applications closely synchronized with automated equipment. Such targets may range in size from small, micron or sub-micron objects viewed in microscopic systems to large objects that are viewed in automated vehicle assembly. In one example, the LED lamp(s) can be used as a strobing light source to illuminate objects during image acquisition by one or more cameras in an automated control system. The acquired images can then be processed to obtain information for the automated control system. In some implementations, circuitry for controlling current precisely and voltage delivered to one or more LED lamps can be included in a compact camera that is used to image the objects illuminated by the one or more LED lamps.

The precision supply circuit can include a precision current controller and a programmable voltage that operate over a wide range of currents (at least one order of magnitude) and a wide range of voltages (at least one order of magnitude), respectively. A voltage can be programmed for a load (such as an LED lamp which may require any one of a wide range of supply voltages) to reduce or minimize wasted energy (heat) and/or stress in both the load and the current controller. The precision supply circuit can provide current and voltage for a precise interval of time (referred to as a "pulse") to precisely control an amount of current (and an amount of charge) delivered to the load. The pulse can have precisely-timed and fast rise and fall times with reduced overshoot following the on and off transitions. Protection features to prevent overdriving the load and/or current controller can also be implemented with the precision supply circuit.

Some implementations relate to a supply circuit comprising: a transistor arranged to conduct current through a load and a feedback circuit to apply a signal to the transistor to control an amplitude of the current conducted by the transistor. The feedback circuit can be configured to: receive a first feedback signal from a first sensing node located in a first current path through which at least a first portion of the current flows when the current flows through the load, and receive a second feedback signal from a second sensing node located in a second current path through which at least a second portion of the current flows when the current flows through the load and when an impedance between the first sensing node and the second sensing node is bypassed by the second current path.

Some implementations relate to a supply circuit comprising: a first transistor arranged to conduct current through a load; a first resistor in a first circuit path through which at least a first portion of the current flows; a second resistor connected in series with the first resistor through which at least a second portion of the current flows when connected to the load; a second transistor arranged to shunt the current around the second resistor; and a feedback circuit. The feedback circuit can be configured to receive a first feedback signal indicative of a first voltage dropped across the first resistor due to the first portion of the current when the second transistor shunts the current around the second resistor and to receive a second feedback signal indicative of a second voltage dropped across a combination of the first resistor and the second resistor due to the second portion of the current when the second transistor does not shunt the current around the second resistor.

Some implementations relate to a method of conducting a current through a load. The method can include acts of: receiving, at a control terminal of a transistor in a supply circuit, a signal that causes the transistor to conduct the current through a load; controlling, with a feedback circuit in the supply circuit and coupled to the transistor, an amplitude of the current conducted by the transistor; receiving in the feedback circuit a first feedback signal from a first sensing node located in a first current path through which at least a first portion of the current flows; receiving in the feedback circuit a second feedback signal from a second sensing node located in a second current path through which at least a second portion of the current flows; and directing the second portion of the current around an impedance connected between the first sensing node and the second sensing node when receiving the second feedback signal.

Some implementations relate to a camera comprising: a housing; an imaging array to acquire images, the imaging array mounted in the housing; and a supply circuit mounted in the housing to conduct a pulse of current through a load that generates light so as to illuminate an object imaged by the imaging array during an image-acquisition period of the imaging array. The image-acquisition period comprises an interval of time during which one frame of image data is captured by the imaging array. The supply circuit can include a transistor arranged to conduct current through a load and a feedback circuit to apply a signal to the transistor to control an amplitude of the current conducted by the transistor. The feedback circuit can be configured to: receive a first feedback signal from a first sensing node located in a first current path through which at least a first portion of the current flows when the current flows through the load, and receive a second feedback signal from a second sensing node located in a second current path through which at least a second portion of the current flows when the current flows through the load and when an impedance between the first sensing node and the second sensing node is bypassed by the second current path.

Some implementations relate to a method of operating a camera. The method can include acts of receiving, at a control terminal of a transistor in a supply circuit, a signal that causes the transistor to conduct a pulse of current through a load; controlling, with a feedback circuit coupled to the transistor, an amplitude of the pulse of current conducted by the transistor; receiving in the feedback circuit a first feedback signal from a first sensing node located in a first current path through which at least a first portion of the pulse of current flows; receiving in the feedback circuit a second feedback signal from a second sensing node located in a second current path through which at least a second portion of the pulse of current flows; directing the second portion of the pulse of current around an impedance connected between the first sensing node and the second sensing node when receiving the second feedback signal; and acquiring a frame of image data of an object with an imaging array of the camera while the pulse of current is conducted through the load.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 2 depicts an implementation of the precision supply circuit of FIG. 1 in an LED lighting and image-acquisition system.

FIG. 3A depicts a front perspective view of a compact camera that can house the supply circuit of FIG. 1 and be used in the lighting and image-acquisition system of FIG. 2.

FIG. 3B depicts a rear perspective view of a compact camera that can house the supply circuit of FIG. 1 and be used in the lighting and image-acquisition system of FIG. 2.

DETAILED DESCRIPTION

Figure 1:
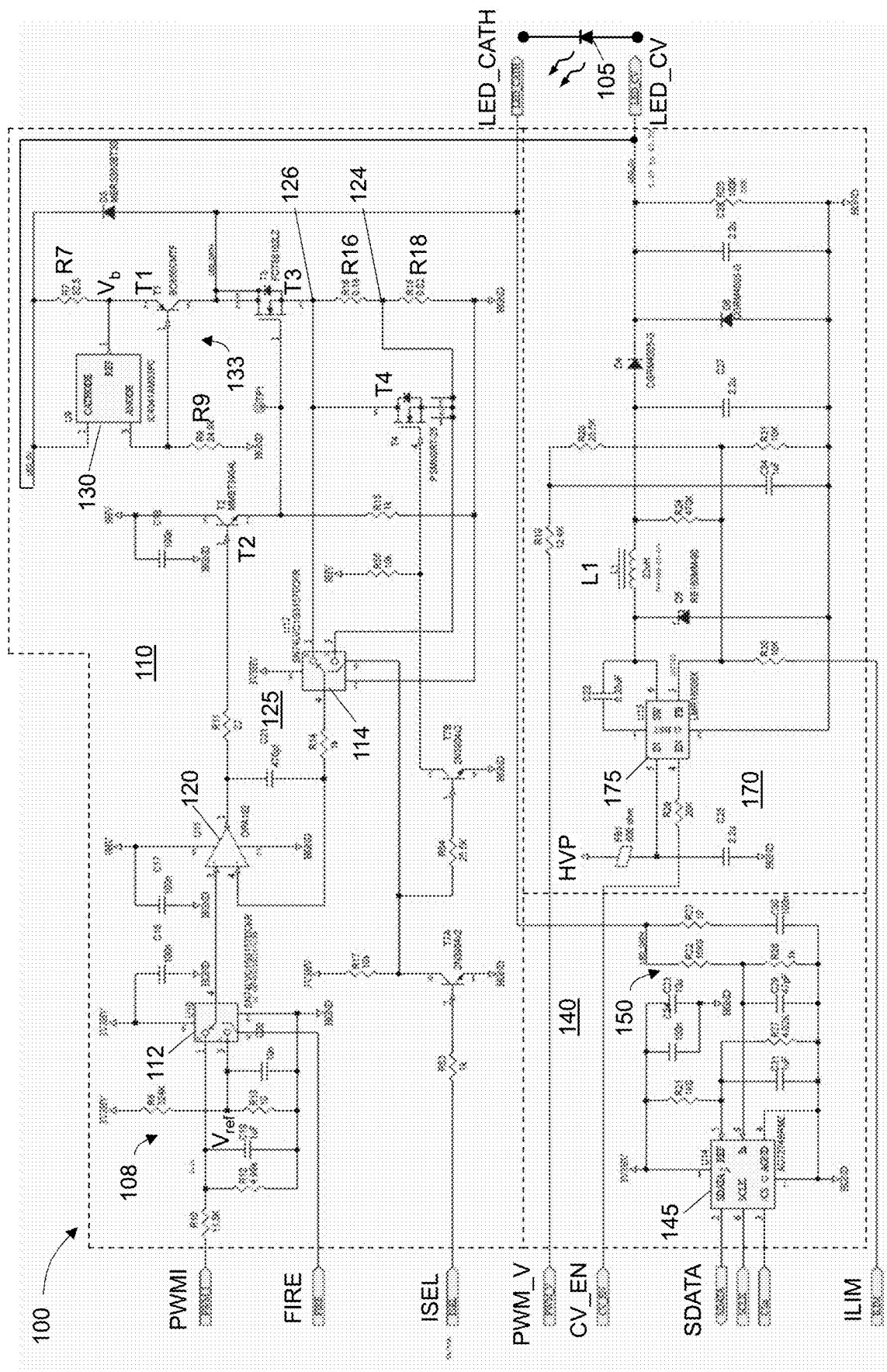
FIG. 1 is a circuit schematic for an example of a wide-range, precision supply circuit that can be used to precisely control current through a load with high precision.

The inventors have recognized and appreciated that an effective way to control some loads (such as an LED-based lighting system that is used to facilitate imaging by cameras) is by driving a precisely controlled current through the load. For an LED lamp, the light output is proportional to the current flowing through the semiconductor junction(s) of the LED lamp. The number of photons produced is essentially proportional to the number of charge carriers that traverse the band gap multiplied by the quantum efficiency (QE) of the LED lamp. Integrating current provided to the LED lamp over the duration of a current pulse can yield the optical energy generated during the pulse. The optical energy is proportional to $QE \times \int_0^T i_c(t)dt$ where T is the duration of the pulse and $i_c$ is current delivered to the LED lamp.

An effective and safe way to deliver a consistent amount of light per event (e.g., a pulse of light) is to establish and maintain a constant current delivered to the LED lamp for a precise length of time. If current, and therefore light output, are controlled to be constant in either of two cases, then image-to-image brightness variation will be negligible. In the first case, the duration of the lighting pulse T is longer than and spans the image-acquisition period $T_i$ required by a camera to capture a frame of image data. In the second case, the image-acquisition period $T_i$ is longer than T and spans the light pulse and there is no other illumination on the object. Establishing a constant level of illumination during a pulse of light to facilitate imaging by a camera for either of these two cases avoids mismatches between the timing of the light pulse and the exposure of the camera and thereby mitigates significant variations in image brightness between images. Additionally, power used by the system can be reduced and lamp lifetime extended compared to a case where the lamps are continuously on and not strobed for each image acquisition.

There are a wide variety of LED-based lighting systems available, some of which can be employed in machine vision applications. These lighting systems may require a relatively large range of different operating currents (e.g., currents ranging from 100 milliamps (mA) in some examples to on the order of 100 amps (A) in other examples). The inventors have recognized and appreciated that there are multiple advantages in implementing an LED-based lighting system driver capable of operating over a relatively wide range of currents while maintaining fast rise and fall times; however, it is challenging to achieve precise control of currents, with rapid response, while also accommodating a wide range of reactive loads. In particular, unwanted levels of ringing and overshoot and increased circuit complexity can be a consequence when using adjustable gain in a feed-back control circuit to drive large currents into highly capacitive loads through a wide range of (inductive) cabling and also to drive smaller currents through less inductive wiring to loads with considerably lower capacitance.

Conventionally, most lighting vendors avoid these issues by either driving LED lamps through constant resistors from a voltage source that is either left on at all times (which wastes power and creates a proportionally large amount of heat that must be dissipated), or by switching power on and off by connecting the voltage source to the light via a two state switch (typically a FET operated alternately in saturation, or fully off). In both cases the voltage of the power supply and the values of the resistors must be matched to each particular LED lamp. Another approach is to drive FET or Bipolar switches into saturation to turn an LED lamp on and off multiple times to achieve a target amount of light over a period of time. This approach has been applied to LED lighting for human viewing but is unsuitable for most machine vision applications where a controlled amount of illumination must be applied in one short interval of time at the moment the target arrives at a precise location.

In view of the foregoing, the present invention is directed generally to systems and methods for precisely conducting a wide range of currents through loads that may have different current and voltage requirements. In an example, a wide-range, precision supply circuit is capable of driving a variety of different LED-based lighting systems over relatively large ranges of voltages and currents, and with precise control over the current (pulsed or continuous) provided to the LED-based lighting system (and hence significantly accurate control over the brightness of the light provided by the LED-based lighting system).

In an example implementation described in detail below, pulse-to-pulse brightness of the light provided by an LED-based lighting system controlled pursuant to the inventive systems and methods disclosed herein is notably consistent (e.g., to about 1 part in 1000 in the amount of light generated from pulse-to-pulse). In one aspect, the current provided to reactive loads (through inductive cables to LED lamps having large capacitive loads) may be overdamped, but still relatively fast, e.g., with rise and fall times from approximately or exactly 1 microsecond (µs) to approximately or exactly 5 µs. Example supply circuit implementations of the inventive systems and methods are capable of operating LED-based lighting systems requiring voltages from approximately or exactly 5 volts (V) to approximately or exactly 100 V with currents from approximately or exactly 100 mA to approximately or exactly 100 A, though other voltage ranges and current ranges are possible. The described circuit topology is readily configurable to drive high and low currents over a range of programmable voltages.

In yet another aspect, an additional feature of the inventive systems and methods is to monitor in real time the instantaneous power delivered to, and thermal energy stored by, a current controller of the precision supply circuit implementing the systems and methods disclosed herein, as well as the instantaneous power delivered to and thermal energy stored by the load (e.g., delivered to an LED-based lighting system to which the supply circuit is connected), so as to maintain the LED-based lighting system within a user-specified appropriate range of operation. The user can specify integration limits, so that total power and/or energy can be tracked for specified integration intervals. According to some implementations, integration of the thermal energy stored in both the current controller and in the load are each performed repeatedly and continuously, evaluated for successive time intervals (e.g., every microsecond), and can be compared with their respective operating limits. Integration of consumed energy can provide information about the thermal loads on the current controller and load, which can be compared to user-specified thermal limits to maintain safe operation. In another aspect, the supply circuit curtails or discontinues a current pulse and/or prevents future pulses until the thermal energy within the supply circuit and/or LED-based lighting system has dissipated sufficiently to safely allow additional operation of the supply circuit and/or lighting system.

1. Wide-Range, Precision Supply Circuit

FIG. 1 is a circuit schematic for an example of a wide-range, precision supply circuit 100 that can be used to deliver a precise amount of current (pulsed or continuous) to a load 105, such as an LED lamp. In some implementations, a precision current pulse (e.g., a precisely timed pulse having a precise amount of current) can be delivered by the supply circuit 100 to the load 105. The precision supply circuit 100 can be loosely divided into three functional sections indicated by the dashed boxes. The first section comprises a wide dynamic range, precision current controller 110 that controls the conduction of current through a load 105, such as an LED lamp. The second section comprises a voltage monitor 140 that can monitor instantaneous voltage across the load. The third section comprises a programmable voltage source 170 (implemented as a buck converter in this example) to apply a voltage at the output of the Buck converter (sometimes referred to as a "compliance voltage") to the load.

In further detail, the current controller 110 includes a first switch 112, an operational amplifier 120, a second switch 114, a shunt voltage reference 130, three transistors T2, T3, T4 (at least some of which may be field-effect or bipolar transistors), and other circuit elements connected as shown in FIG. 1. The current controller 110 employs feedback to the op-amp 120 (in a feedback circuit 125) to control the gate (or base) of transistor T3 to conduct a precise level of current (from tens of milliamps to 50 A in this circuit example) through a load 105, when connected to the precision supply circuit 100.

The feedback circuit 125 includes the op-amp 120, transistor T2, and second switch 114. The op-amp 120 outputs a signal applied to the control terminal (gate in this example) of transistor T3. As such, the feedback circuit precisely controls the amplitude of the current conducted by the transistor T3. A voltage feedback signal can be obtained from one or both sensing impedances (implemented in this example as resistors R16, R18) through which most (if transistor T3 has current leakage) or all of the current conducted through the load passes. One or both of sensing resistors R16 and R18 can be implemented more generally as an impedance (e.g., at least as one resistor, or a plurality of resistors connected in series and/or parallel) and may further include some inductance and/or capacitance. The sensing resistors R16, R18 can connect between the load 105 and a reference potential (which is ground in the illustrated schematic, but could be a voltage in some implementations).

Sinking current through the load 105 can be initiated by applying a pulse-width-modulated (PWM) signal to pin PWMI (e.g., a high logic signal) and applying (subsequently in some cases) a signal to the pin labeled FIRE in FIG. 1. The PWM signal passes through the analog switch 112 and is applied to the non-inverting terminal of the op-amp 120 (which is configured as a comparator). The op-amp 120 effectively compares the average voltage of the PWM pulse train (filtered with a low-pass RC filter after pin PWMI) with the voltage received from sensing resistor(s) R16, R18 and outputs a voltage to drive a voltage follower (implemented with transistor T2) that in turn drives the gate of transistor T3, causing it to go into conduction. A logic high signal, for example, can be applied to pin FIRE to initiate a sink current for a short interval of time (e.g., as short as 10 μs or less). Any pulse duration can be implemented with the precision supply circuit 100, and the supply circuit 100 can be operated to sink current continuously (e.g., in DC mode) by leaving the logic high signal applied to pin FIRE. The amount of voltage applied to the gate (or base) of transistor T3 (and hence the amount of current flowing through transistor T3, when operating T3 in its linear range) can be controlled by adjusting the duty cycle of the PWM signal applied to PWMI.

Although the current controller 110 is arranged to sink current from the load 105 in the schematic of FIG. 1, in other implementations the current controller can be arranged to source current to the load. For example, the load can be placed between the transistor T3 and reference potential (ground in this example) and the sensing resistors R16, R18 can be moved to the drain side of transistor T3 (e.g., connect in series directly between the supply voltage LED_CV and the drain of T3, or connected in series between T1 and T3 where the voltages across the resistors are sensed differentially). Other arrangements to sense current through the load with sensing resistors R16, R18 are possible, as could be determined by those skilled in the art in light of this description. The choice of transistor T3 (n-channel vs. p-channel FET or npn vs. pnp BJT, for example) can depend upon the polarity of the voltage supply used to provide voltage to the load and whether the current controller 110 is arranged to source current to or sink current from the load 105.

In a first setting (programmable at pin ISEL), transistor T4 is turned off and the second switch 114 is toggled to couple the inverting node of op-amp 120 to a first sensing node 126 (at the drain or collector of transistor T3). In this configuration, at least a first portion of the current conducted through the load by transistor T3 flows through both resistors R16 and R18 (along a first circuit path that includes the first sensing node 126) and the voltage sensed is determined by the sum of the two resistance values (0.2 ohms in this example). For this configuration and example circuit, a swing in current through the load from 10 mA to 5A will produce a feedback voltage swing from 2 mV to 1 V, a same range of feedback voltages as for the high-current setting.

In a second setting, transistor T4 can be turned on (into conduction) so that resistor R16 is bypassed. At least a second portion of current conducted through the load flows through T4 (along a second circuit path) instead of R16 and then flows through R18, which has a lower resistance value (0.02 ohms in this example) than R16 (0.18 ohms). The second programmable setting can be for high currents (e.g., currents greater than 5 A). The same second setting can toggle the second switch 114 to couple the inverting node of op-amp 120 to a second sensing node 124 between resistor R16 and resistor R18 and in the second current path. By sensing current flowing only through the smaller resistor R18, the feedback voltage is reduced by a factor of 10 compared to what would be sensed, at the first sensing node 126 above R18, for current flowing through both resistors R16 and R18. Thus, the range of feedback voltages for large current swings can be reduced to maintain the op-amp 120 in a linear operating region. For this configuration and example circuit, a swing in current through the load from 100 mA to 50 A will produce a feedback voltage swing from 2 mV to 1 V.

In this manner, the op-amp 120 can be kept in a linear range of operation for a wide range of driven currents through transistor T3 without changing the gain of the op-amp 120. This approach to controlling a wide range of currents also preserves the speed and slew rates of the op-amp such that current on times and off times (measured as 90% on voltage and 90% off) can be on the order of 5 μs or less for high and low current ranges. By operating the supply circuit 100 in the first setting at pin ISEL, when controlled currents are 5 A or larger, the feedback voltage received at the inverting terminal of op-amp 120 will always be greater than or equal to 100 mV, resulting in much faster slew rates of the op-amp 120 and the resulting load current through T3. Similarly, when operating with the second setting at pin ISEL, the same slew rates of the op-amp 120 in the feedback circuit 125 can be achieved for a current of 500 mA.

Naturally, the approach to controlling a wide range of currents can be extended further. For example, another resistor can be added in series with resistors R16 and R18. Another bypassing transistor (like T4) can be added to shunt the third resistor. The second switch 114 can be replaced with a three-way switch, or another two-way switch can be added to the circuit. Another ISEL pin can be added to implement a third setting that would couple the inverting node of op-amp 120 to a third node at which the sensed voltage would be the sum of all three resistors.

The precision supply circuit 100 can be operated without T4, the circuit path to bypass resistor R16, and without the second switch 114. In such an implementation, power would unnecessarily be dissipated in R16 when sensing is done at second sensing node 124 and the precision of current control may be diminished.

Another feature of the current controller 110 is that it can bias the transistor T3 and provide a small quiescent or standby current to the transistor T3 when the load 105 (e.g., LED lamp) is off. This allows the load 105 to be turned fully off (e.g., negligible or no current flowing through the load) while keeping the transistor T3 in a ready state with gate capacitances charged. Keeping the transistor in a ready (slightly conducting) state reduces the time to turn transistor T3 sufficiently on to conduct the commanded current through the load 105. The shunt voltage reference 130 is arranged in the current controller 110 (with transistor T1 and resistors R7 and R9) to act as a current source 133, using output from the programmable voltage source 170 (LED CV). This current source can provide the small current (less than 100 mA) to transistor T3 when current through the load 105 is terminated to maintain transistor T3 in the ready state for rapid turn-on.

Additionally, the first switch 112 can be toggled (via pin FIRE) to connect the non-inverting input of the op-amp 120 to a fixed reference voltage Vres provided by a voltage divider 108. The value of Vref can be selected to provide a sufficient biasing voltage to the gate (or base) of power transistor T3 such that the transistor T3 draws a small quiescent or standby current (supplied by the programmable voltage source 170). This biasing voltage and quiescent current keep the power transistor from turning fully off and in a ready state, so that it can rapidly slew to an on state when receiving a next firing command via pin FIRE.

For a circuit implementation, the first switch 112 and the second switch 114 can be analog switches, such as single-pole double-throw analog switch SN74LVC1G3157DCKR available from Texas Instruments of Dallas Texas. Op-amp 120 can be precision operational amplifier OPA192 available from Texas Instruments of Dallas Texas, for example. The shunt voltage reference 130 can be integrated circuit LM4041 available from Texas Instruments of Dallas Texas, for example. The power transistor T3 can be a PowerTrench® MOSFET FDT86102LZ available from onsemi of Phoenix, Arizona, though other types of transistors including bipolar transistors can be used. Transistor T4 can be a PSMNOR7-25-series MOSFET available from Nexperia of Nijmegen, Netherlands, for example, though other types of transistors including bipolar transistors can be used. Transistor T1 can be a BC856-series transistor available from Nexperia of Nijmegen, Netherlands, for example. Because only a small amount of current is supplied through transistor T1 during an idle state of transistor T3, the maximum current rating of transistor T1 can be a fraction (e.g., $1/10^{th}$ to $1/100^{th}$ of the maximum current rating of transistor T3).

The precision supply circuit 100 also includes the programmable voltage source 170. In the example implementation of FIG. 1, the programmable voltage source 170 comprises a buck converter that is based, in part, on a regulator chip 175 (model LMR16006 available from Texas Instruments of Dallas Texas, for example) and inductor L1. The buck converter steps down an input DC voltage (HVP provided to an input pin of the regulator chip) to a lower voltage that is determined by the duty cycle of a PWM signal applied to pin PWM_V. The applied PWM signal controls the duty cycle of current switched through the buck converter's inductor and therefore determines the output voltage from the programmable voltage source 170. Other types of programmable voltage sources can be used in other cases (e.g., a programmable buck-boost converter, a programmable flyback converter). The converter can be turned on and off with a signal applied to pin CV_EN. The example programmable voltage source 170 is configured to output a compliance voltage from approximately or exactly 5 volts to approximately or exactly 50 volts, though other ranges of output voltages are possible. The programmable voltage source 170 also provides for adjustable current limiting via pin ILM, which controls a feedback voltage applied to the regulator chip's feedback input.

The voltage monitor 140 of the precision supply circuit 100 can monitor the voltage at the output of the load 105 (e.g., LED lamp) at a high frequency, so that essentially the instantaneous voltage drop across the load can be tracked during circuit operation. The example voltage monitor 140 uses a high-speed analog-to-digital converter (ADC) 145 (model AD7274 available from Analog Devices of Wilmington, Massachusetts, for example) to sample a voltage indicative of the voltage at the output of the load (e.g., the voltage of the LED lamp's cathode in the illustrated example). A voltage divider 150 can be used to scale the sampled voltage into a range that can be detected at an input to the ADC 145. The ADC can sample and transmit (via pin SDATA) detected voltage values at rates as high as 1 per microsecond. The sampling data rate can be determined by a clock signal provided to a clock input (via pin SCLK) of the ADC 145 and the data transmission rate can be determined by a signal applied to a select input (via pin CSn). The difference between the programmed compliance voltage and the measured voltage at sensing node 126 or sensing node 124 multiplied by the programmed current can be used to compute repeatedly (for a sequence of samples obtained by the ADC 145) the instantaneous power being provided to and dissipated in the load. If the current the load can pass at the programmed voltage is less than the programmed current, then the instantaneous power valued calculated as described will at least be an upper bound for the actual power dissipated in the load resulting at worst in a conservative estimation of the instantaneous power.

Because the ADC 145 monitors voltage at the output (or low-voltage side) of the load, it directly monitors the voltage drop across the precision current controller 110. Voltage drops across current-sensing resistors R18 (when T4 is conducting) and across resistors R16 and R18 (when T4 is off) multiplied by the programmed current provides the power dissipated in the resistors. Or if the load can't pass the programmed current at the programmed voltage, then the calculated power will be at worst an upper bound on the actual power dissipated in the resistors. The on resistance of power transistor T4 is negligible when T4 is on. The measured voltage less the voltage drop across the resistors is the actual voltage across T3. Monitoring the single voltage at the output of the load together with some calculation can provide several useful pieces of information: (1) the voltage drop and power across the load, (2) the voltage drop across the power transistors T3, T4 and the current-sensing resistor(s), (3) an upper bound on the current flowing through the power transistors T3, T4, the current-sensing resistor(s), (4) an upper bound on the current flowing through the load, (5) an upper bound on the power delivered to the load, and (6) an upper bound on the power delivered to the power transistor(s)

2. Lighting and Image-Acquisition System

FIG. 2 depicts an implementation of the precision supply circuit 100 in an LED lighting and image-acquisition system 200. The system 200 includes the supply circuit 100 communicatively coupled to a controller 210 and arranged to strobe an LED lamp (load 105). The system further includes a camera 220 arranged to photograph an object 230, which may pass by the camera 220 on a conveyer 240. Such an LED lighting and image-acquisition system 200 may be implemented in a manufacturing facility (e.g., for part inspection) and may be part of a more complex automated control system.

The controller 210 can be implemented with at least one processor (such as a microcontroller, field-programmable gate array (FPGA), programmable logic controller (PLC), application-specific integrated circuit (ASIC) microprocessor, digital signal processor (DSP), or some combination thereof). The controller 210 can provide signals to control the supply circuit 100 (e.g., to program the voltage (at output pin LED_CV) applied to the load, and to conduct or terminate conduction of current through the load (via transistor T3 of FIG. 1)). The controller 210 can also receive signals from the supply circuit 100 (e.g., receive serial data signals from the ADC 145 representative of the near-instantaneous voltages measured at the output of the load). The controller 210 can also provide signals to the camera 220 (e.g., to control acquisition of images) and receive image data from the camera 220. In some cases, the controller 210 can be implemented, at least in part, as described in U.S. Pat. No. 9,459,607, titled "Methods, Apparatus, and Systems for Monitoring and/or Controlling Dynamic Environments," issued Oct. 4, 2016, which patent is incorporated herein by reference in its entirety. In some cases, intermediary circuitry can be used between the controller 210 and supply circuit 100, such as the flexible input-output circuitry described in U.S. Pat. No. 11,182,326, titled "Input/Output Apparatus and Methods for Monitoring and/or Controlling Dynamic Environments," issued Nov. 23, 2021, which patent is incorporated herein by reference in its entirety. In some cases, the intermediary circuitry can also be included within the camera 220.

The controller 210 can include a system clock and/or other circuitry that is used to synchronize operations through the lighting and image-acquisition system 200. For example, the controller 210 can determine the start time and duration of a pulse applied to pin FIRE of the current controller 110 (to turn on an LED lamp for a short or long interval of time, for example) based on clock cycles of the system clock or an exposure setting that can be set with circuitry of the camera. The controller 210 can coordinate image acquisition by the camera 220 with the firing of the LED lamp using conventional logic circuitry to trigger the image acquisition in response to firing of the LED lamp, or to fire the LED lamp in response to initiation of image acquisition. In some cases, the firing of the LED lamp and/or image acquisition can be based on an event detected in the lighting and image-acquisition system 200. An example event could be the arrival, at a specific location, of a part or object transported on a conveyor.

Although the illustration of FIG. 2 depicts the supply circuit 100 separated from the camera 220, the invention is not so limited. In some implementations, the supply circuit 100 is contained on a printed circuit board (PCB) that can mount within a housing of the camera 220 and the camera can be very compact in size (measuring no more than 50 mm×50 mm×50 mm, for example). Such a compact camera 220 is depicted in FIG. 3A and FIG. 3B. The housing can include an imaging array, its associated operating and readout electronics, and two supply circuits 100 to drive two loads 105 (e.g., two LED lamps). For example, the camera 220 can house the supply circuit 100 and have two outputs (LED_CV1, LED_CATH1), (LED_CV2, LED_CATH2) to drive two LED lamps (second output and lamp not shown in FIG. 2) that are spaced apart to provide more uniform illumination of the object 230, or are synchronized to provide differently illuminated views of the same object 230.

Referring to the front perspective view of FIG. 3A, the camera 220 can include a housing 221 in which the imaging array 222 is mounted behind a lens mount 224 for a lens assembly 225 (depicted in FIG. 2). The housing can be made from a metal, plastic or combination thereof. The imaging array 222 can be a CCD or CMOS 2D imaging array and comprise any number of pixels (e.g., from 10,000 to 4,000,000 or more). The imaging array 222 can be mounted on a PCB that is secured within the housing 221. The imaging array and electronics on the PCB can include circuitry to deliver power to transistors that operate read-out and resetting of the pixels, receive an external trigger signal, buffer pixel data, frame data for transmission, and transmit the data, among other functionalities. The lens mount can be a 25 mm, threaded CS mount, though other types of lens mounts can be used.

The rear of the camera 220, illustrated in the rear perspective view of FIG. 3B, can include one or more connectors to attach wiring and or cabling to the camera (e.g., for power, programming, and communications with the controller 210). For the illustrated example, two first connectors (e.g., M8 female connectors) and one second connector (e.g., RJ45 connector) are mounted on the rear side of the camera 220, though other kinds of connectors can be used. Power-over-ethernet (POE) can be provided through the second connector 228, which can also be used to communicatively couple the camera 220, the precision supply circuit 100, and the controller 210, and other device(s), or some combination thereof. At least one second connector 227 can connect via cabling to a remotely located load 105 (e.g., LED lamp). The housing 221 can include mounting features (e.g., threaded holes 229) to secure the camera 220 to a fixed mount.

3. Power Limiting

The supply circuit 100 of FIG. 1 allows for circuit protection of the load and power transistors T3, T4 when implemented in a control system such as that illustrated in FIG. 2. As described in connection with FIG. 1, monitoring the voltage at the output of the load provides several pieces of useful information that can be used to protect the load and power transistors from excessive power dissipation that could degrade these devices. As described above, the ADC 145 can continuously output near-instantaneous monitored voltage values (CV_CATH) at the output of the load. These voltage values give near-instantaneous information about: (1) the voltage drop across the load, (2) the voltage drop across the power transistors T3, T4 and the current-sensing resistor(s), (3) the current flowing through the power transistors T3, T4 and current-sensing resistor(s), (4) the current flowing through the load, (5) the power delivered to the load, and (6) the power delivered to the power transistor(s).

An aspect of the current controller 110 is that the current IR flowing through the sensing resistor(s) R16, R18 is essentially programmed or set by the input applied to pin PWMI. The op-amp 120 in the feedback circuit 125 forces the voltage at the inverting terminal of op-amp 120 to be the same as the voltage at the non-inverting terminal, which (in the example circuit of FIG. 1) is the average voltage of the PWM signal applied to pin PWMI. Since the voltage at the inverting terminal of op-amp 120 is the voltage sensed and dropped across the sensing resistor(s) R16, R18, then the average voltage of the PWM signal essentially programs the current IR flowing through the sensing resistor(s) according to Ohm's law.

The near-instantaneous voltage drop $V_L$ across the load (item 1 above), can be determined from:

$$V_L = V_{CV} - V_{CA} \tag{1}$$

where $V_{CV}$ is the known, programmed voltage at the output of the programmable voltage source 170 (pin LED_CV) and $V_{CA}$ is the monitored voltage at the output of the load (pin LED_CATH) by the voltage monitor 140. This computation (and those in EQ. 2 through EQ. 3 below) can be done for every sampling period of the ADC 145 or for every N sampling periods, where N is an integer from 1 to 1000. The feedback circuit, managed by op-amp 120 controls the current IR as described above. This current also passes through both the load 105 and the power transistors T3, T4.

The near-instantaneous power $P_L$ delivered to the load (item 6 above) can then be approximated using EQ. 1.

$$P_L = I_R V_L \tag{2}$$

The near-instantaneous power $P_T$ delivered to the power transistor(s) can be approximated as $$P_T = I_R V_{CA} \tag{3}$$

which overestimates the power delivered to the power transistor(s) by a small, negligible amount that is dissipated in the current-sensing resistor(s) R16, R18.

The near-instantaneous values $V_L$, $I_R$, $P_L$, and $P_T$ can be computed repeatedly by the controller 210, for example, in real time (e.g., every few microseconds) as the current is conducted through the load 105 and terminated. The controller 210 can also compute accumulated energy per pulse Ep delivered to the load and power transistor(s), which on a pulse-by-pulse basis is the product of power and pulse duration $t_p$.

$$E_{pL} = P_L t_p \quad (4)$$

$$E_{pT} = P_T t_p \quad (5)$$

The pulse duration can be set by the controller 210 and therefore known. These calculations are based on the feedback signal of monitored low-side load voltage received from the ADC 145 of the voltage monitor 140 of FIG. 1.

Power and/or energy limits for the power transistors T3, T4 ($P_{T3,lim}$, $P_{T4,lim}$, $E_{T3,lim}$, $E_{T4,lim}$) and load ($P_{L,lim}$, $E_{L,lim}$) can be stored in memory that can be accessed by the controller 210. These limits can be defined to allow for the cooling characteristics of the precision supply circuit 100 and its power transistors T3, T4 and cooling characteristics of the load 105. With these parameters, controller logic can be instantiated to inhibit pulses of current to the load when the power and/or energy limits are exceeded. For example, the controller may continuously compare calculated power and/or energy delivered to each of the load and power transistor(s) with their corresponding power and/or energy limits and inhibit current output to the load 105 to prevent exceeding any power and/or energy limit.

In further detail and according to one implementation, an 18×18 binary multiplier in the controller 210 can be used to multiply the computed products in one or more of EQ. 2, EQ. 3, EQ. 4, and EQ. 5 above to determine power and energy levels delivered to the load 105 and power transistor(s) T3, T4. In some cases, the received binary value from the ADC 145 may be encoded in units of voltage×256 and the binary computed current can be encoded in units of milliamps. In such cases, the top 28 bits of the result from the 18×18 binary multiplier represent the instantaneous power or energy dissipated by the power transistor(s) or lamp (in milliwatts), depending on whether the multiplication is done for the transistor(s) or lamp. For cases where the maximum lamp supply voltage is less than 128 VDC, the largest possible value is less than 1024 watts, so only bits [27 . . . 8] of the 18×18 multiplier product may be used.

If the near-instantaneous power ($P_L$ and/or $P_T$ in milliwatts) are/is accumulated every microsecond that the supply circuit 100 is activated, the resulting sum(s) will represent accumulated energy(ies) in nanojoules (nJ). The real-time accumulated energy $E_L$ for the load 105 can be represented by the following expression:

$$E_L = \sum_n^{n+m} P_{L,n} \quad (7)$$

where $P_{L,n}$ is the $n^{th}$ computed near-instantaneous power $P_L$ delivered to the load (for the $n^{th}$ microsecond in this example). The integration interval m can be specified by a user. Similar computations can be done for the power transistors T3, T4. So, calculating the accumulated energy delivered to the load and power transistors T3, T4 comprises adding the corresponding computed power values to corresponding accumulators every microsecond (or interval of time other than one microsecond). The invention is not limited to one microsecond accumulation intervals and accumulated values in units of nJ; other accumulation intervals and energy units are possible.

Since energy is also released thermally from the load 105 and power transistors T3, T4, the accumulated energy of EQ. 7 can be modified to account for thermal dissipation of energy by each device. Each device's thermal power-dissipation rate will depend on several factors, such as the thermal conductivity between the device and the surrounding environment and the temperature of that environment. The thermal power-dissipation rate can be characterized as a thermal-dissipation power rating $P_d$ for each device The thermal-dissipation power rating will vary depending on how the device is physically implemented and what the anticipated maximum temperature of the environment will be. The thermal-dissipation power rating can be determined empirically for each device, may be obtained theoretically, or obtained from device specifications for different device applications. In the case of one example camera 220 and housed precision supply circuit, the thermal-dissipation power rating was found to be approximately 500 mW for the power transistors T3, T4. Since the thermal cooling occurs all the time, the controller 210 can subtract accumulated, thermally-dissipated energy from the accumulated energy delivered to the device every computation interval to determine the net energy level $E_n$ at the device an any time. For the load, the computation is as follows:

$$E_{nL} = \sum_{n=1}^{m} (P_{L,n} - P_{dL}) \quad (8)$$

In practice, $P_d$ can vary with temperature of the environment into which heat is dissipated. According to some implementations, a thermistor or other temperature sensor can be used to provide temperature feedback about the environment to the controller 210. The controller 210 can then select a value for $P_d$ (e.g., from a look-up table) or compute a value for $P_d$ based on the sensed temperature. At some point after which current is no longer conducted through the load, the energy accumulation in EQ. 8 will reduce to zero. Once the accumulator reaches a zero value, the controller can suspend accumulation until current is conducted through the load again.

To protect a device, the controller 210 can compare a stored energy limit for the device with the device's corresponding current value of net energy (e.g., $E_{L,lim}$ for the load 105 compared against $E_{nL}$). If the current value of net energy equals and/or exceeds the device's energy limit, then the controller can stop conducting current through the load until the current value of net energy drops below the energy limit. Since the comparison can be done every computation cycle, the controller 210 can curtail or discontinue conduction of current by transistor T3 before reaching the initially-intended duration of the current pulse.

The thermal-dissipation power rating and energy limit can be conservative values, such that the load temperature or transistor temperature will not rise to the point where the device's lifetime would be significantly reduced. A control system incorporating the supply circuit and protection features described above makes it virtually impossible to damage the supply circuit 100 or the load by overdriving the circuit or load. As an example, the power transistors T3, T4 will be protected even if a mis-wired lamp cable connects the positive rail from the programmable voltage source 170 directly to the drain of the power transistor T4 and the circuit is fired to conduct current through the transistor.

4. Example Circuit Performance

Figure 4A:
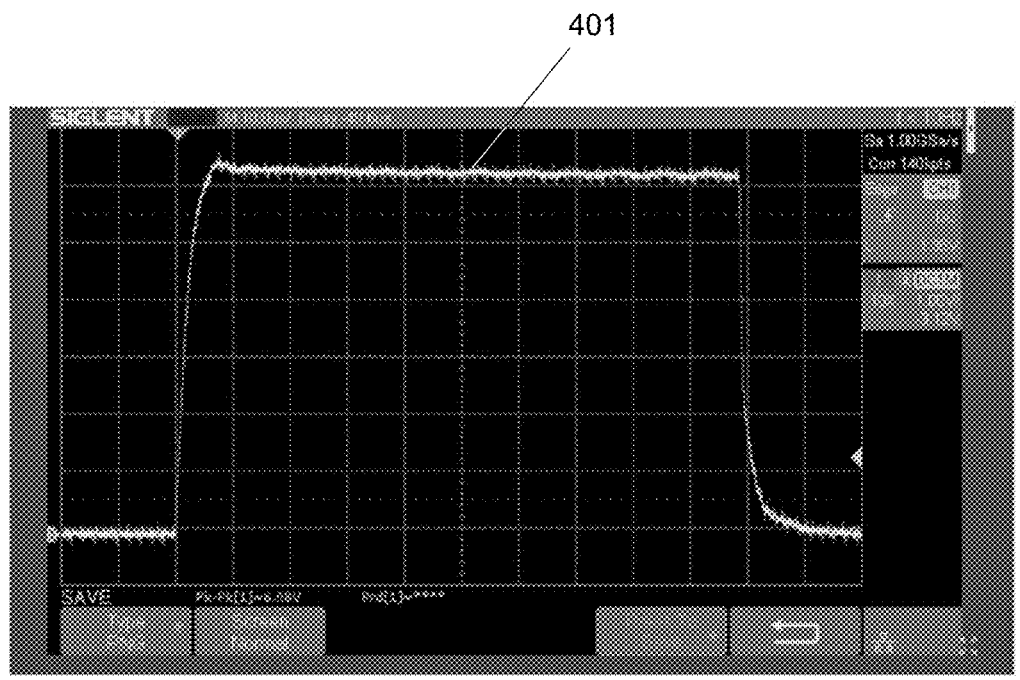
FIG. 4A is an oscilloscope trace of a pulse output from a wide-range, precision supply circuit constructed in accordance with the circuit schematic of FIG. 1.

A precision supply circuit 100 has been constructed in accordance with the circuit schematic of FIG. 1. The circuit was arranged to sink 14 amps of current passing through an LED lamp for a pulse duration of approximately 100 microseconds applied to the gate of transistor T3. A trace 401 of the current pulse from the lamp is shown in FIG. 4A. The trace was 410 obtained by measuring the voltage across a 0.45 ohm resistor connected to the cathode of the lamp.

The trace 401 exhibits an overdamped behavior, shows little overshoot (less than 4%), and highly uniform current throughout the plateau of the pulse. The amplitude of the current along the plateau varies by less than 2% after the small overshoot, such that the current remains constant (to within 2%, peak-to-peak) for approximately 88% of the pulse duration. In some implementations, the current can remain constant (to within 5%, 2%, or 1%) for not less than 85%, 90%, or even 95% of the pulse duration, depending on the level of current switched through the load 105 and components selected for the current controller 110.

Figure 4B:
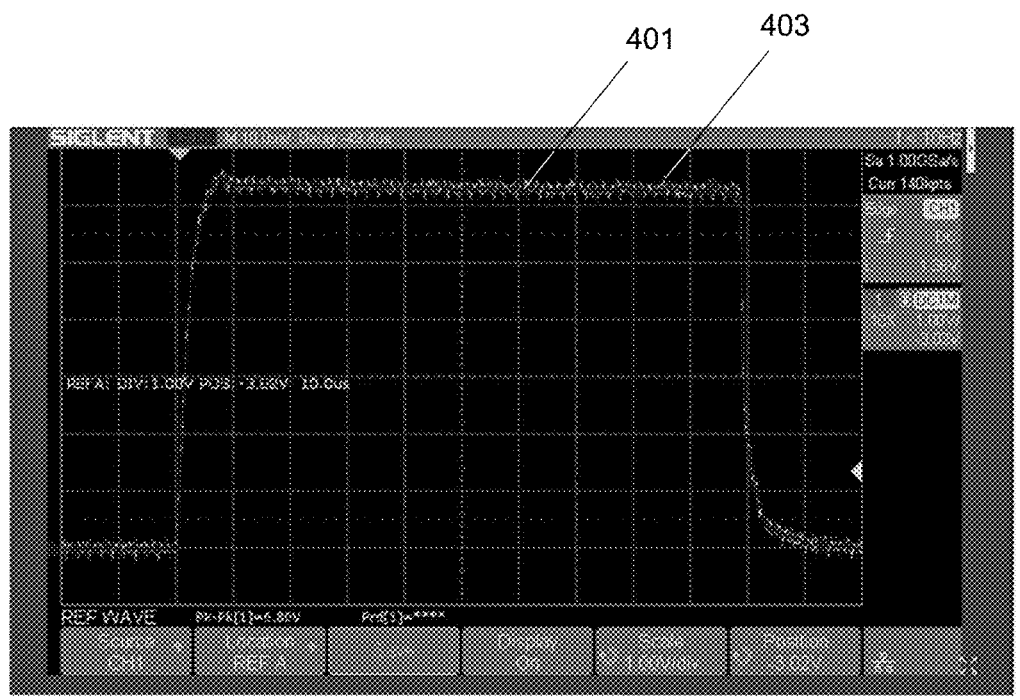
FIG. 4B shows repeatability of pulses from the wide-range, precision supply circuit constructed in accordance with the circuit schematic of FIG. 1.

FIG. 4B plots two oscilloscope traces 401, 403 (overlaid) of the 14 A current pulse taken at two different times. The same parameters (e.g., programmable voltage, pulse duration, etc.) were set to operate the supply circuit 100. The overlap shows very high precision and repeatability of the two pulses, which illustrates the consistency of current and consistent light control by the precision supply circuit 100. The reference trace 401 (in blue) is overlaid on the later-acquired trace 403 (in white). The later-acquired trace 403 is almost entirely eclipsed by the reference trace 401. Only ambient noise picked up by the scope ground lead allows any of the later-acquired trace 403 to be visible. The pulse-to-pulse uniformity of the current (and of light exposure for an LED lamp driven by the current) is at least 1 part in 1000, and may be up to 1 part in 10,000 or even up to 1 part in 100,000.

5. Alternative Implementations

Figure 5:
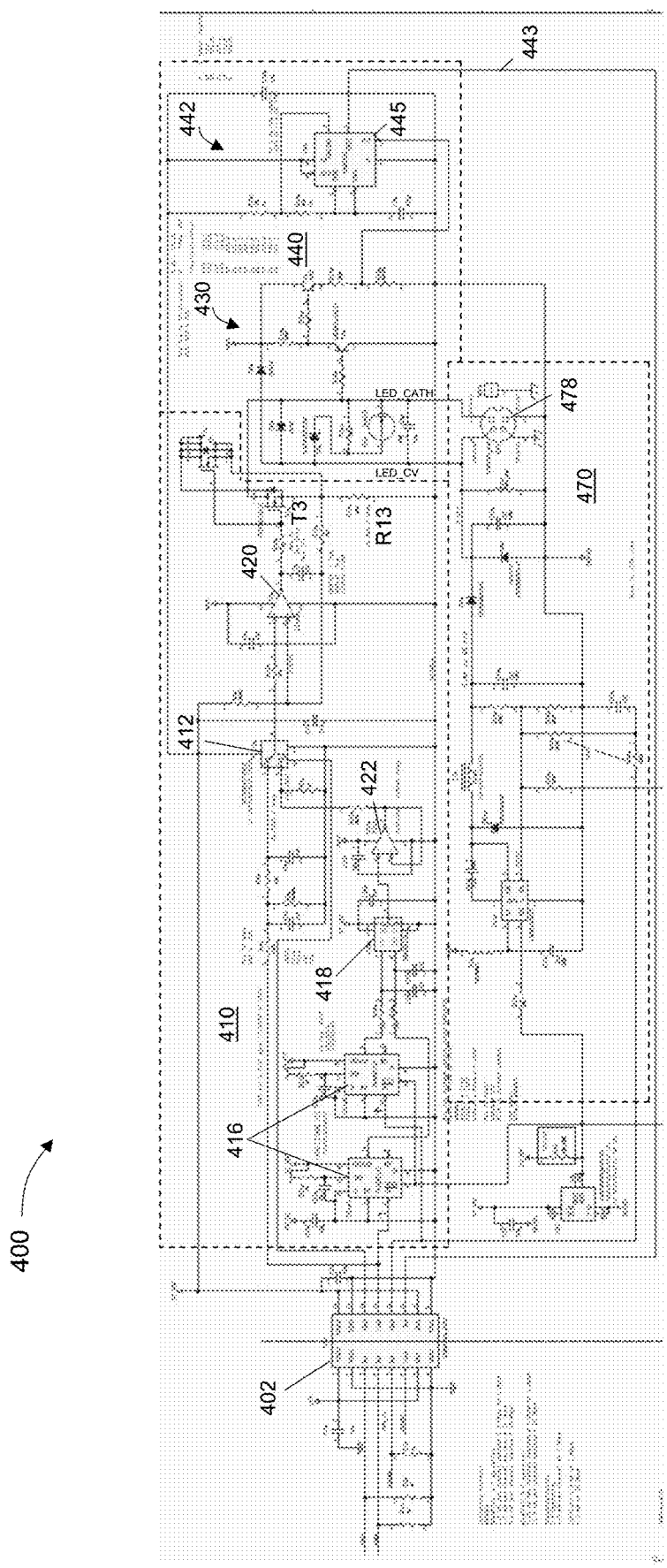
FIG. 5 is a circuit schematic for a second example of a precision supply circuit that can be used to precisely control current through a load.

There are additional ways to implement functionalities of the precision supply circuit 100 of FIG. 1. FIG. 5 is a circuit schematic for another example of a supply circuit 400 that continuously monitors the voltage on the low-voltage side of the lode (e.g., at a cathode of an LED lamp). The supply circuit 400 contains similar sections to the section identified in the supply circuit 100 of FIG. 1, though implemented with different circuitry for some of the sections. For example, the supply circuit 400 includes a current controller 410, voltage monitor 440, and programmable voltage source 470. The programmable voltage source 470 is similar to the programmable voltage source 170 of FIG. 1 and includes a buck converter.

The current controller 410 includes a single current-sensing resistor that provides feedback to the op-amp 420 to precisely control the current level conducted through the load 105 (e.g., an LED lamp that can connect to the circuit via connector 478). Input to the op-amp 420 can be switched (with analog switch 412) between a first PWM input passed directly through a digital isolator 402 to control the amount of current conducted with power transistor T3 and a second programmable PWM source internal to the current controller 410 for a standby mode of the transistor T3. The programmable PWM source comprises two dual retriggerable monostable multivibrators 416 (model 74AHC123 available from Texas Instruments of Dallas Texas, for example) a 128-tap linear taper digital potentiometer 418 (model MAX5128 available from Analog Devices, for example), and an op-amp 422.

The voltage monitor 440 employs a voltage-frequency conversion circuit 442 having a timer 445 (model LMC555 available from Texas Instruments of Dallas Texas, for example) to convert a voltage from bias circuitry 430 to a frequency of an oscillating signal output from the timer 445. An output from the timer 445 can be returned to a controller 210 to determine voltage at the output of the load.

In further detail, a frequency inversely proportional to the voltage LED_CATH at the output of the load is imposed onto the feedback signal line 443 by circuit elements within the current controller 410. The voltage-to-frequency transfer function depends on the characteristics of these circuit elements, which in turn may depend on the intended application of the precision supply circuit 400. For instance, supply circuits 400 that operate across a wide range of voltages may have different component values than supply circuits 400 that operate across a much narrower range of voltages.

In order for the controller 210 to properly determine the voltage for any given supply circuit 400 implementation, parameters representing the particular supply circuit 400 for a given device can be stored in non-volatile memory to be retrieved by the controller 210 on power-up so that the voltage-to-frequency conversion can be correctly calculated.

For instance, a linear approximation of the voltage of the form y=mx+b may be used to convert the feedback signal frequency to the voltage on the drain of the power transistor T3. But depending on characteristics on the devices in the circuit, the slope and offset of this linear approximation may vary.

Figure 6:
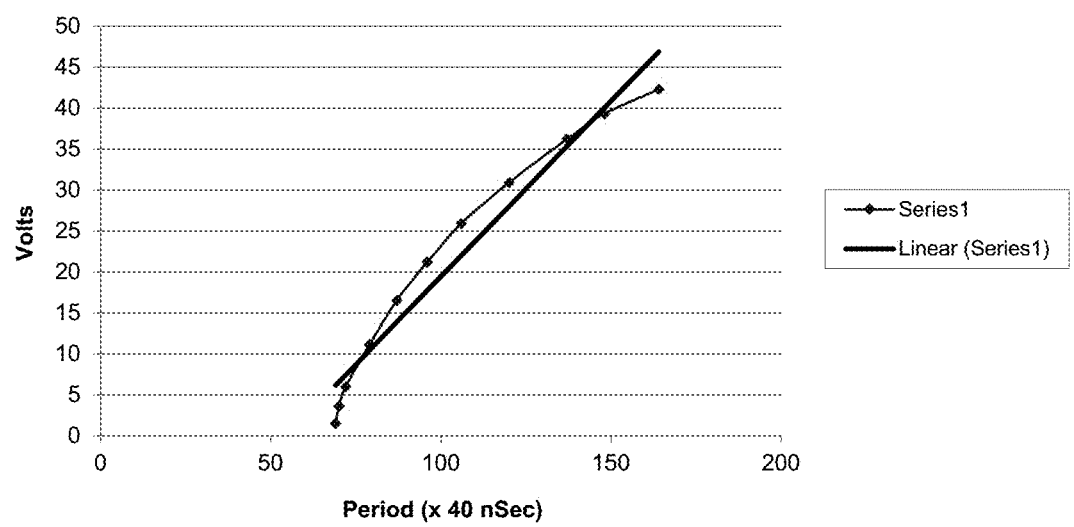
FIG. 6 plots a measured relation between voltage and generated period of an oscillating signal output from voltage-to-frequency conversion circuitry along with a linear fit to the curve.

For one example implementation, represented with FIG. 6, the voltage at the drain of the power transistor T3 has a non-linear dependence on the measured period (by timer 445) of the oscillating signal from the voltage-to-frequency conversion circuitry. FIG. 6 shows a linear approximation to the curve, which yields a slope of 0.4285 and an offset of −23.406.

In an example controller 210, such as an FPGA, the period of each cycle of the oscillating voltage-to-frequency signal can be measured in units of 40 nanoseconds (ns). If an application requires a maximum lamp voltage of 48 VDC, the frequency range can fall between 125 kHz to 500 kHz, and the period can range from 2 µs to 8 µs. Hence, the maximum period in increments of 40 ns can be 200, so the period value can be represented as an 8-bit binary value in the signal from the timer 445 and in controller logic.

Since the voltage calculation involves multiplying the period times the slope, and since the controller can contain binary multipliers that can operate at 200 MHz frequencies embedded in the silicon fabric while floating-point multipliers use valuable logic resources and operate at much lower frequencies, it makes sense to use the binary multiplier and calculate output load voltage $V_{CA}$ as V×256 (rather than V) as follows:

$$V \times 256 = (\text{slope} \times \text{period}[7 \ldots 0] + \text{offset}) \times 256$$

So, in this example case of FIG. 6, the slope value for multiplication can become 256×0.4285, or 110, and the offset value can become 256×−23.406, or −5992. The slope value can be stored in one byte of the controller's non-volatile memory, while the offset value can be stored in one word of the controller's non-volatile memory.

In the controller logic, the start of a new cycle of the oscillating voltage-to-frequency signal is determined by detecting the rising edge of the signal. The period is measured by incrementing a counter in the timer 445 every 40 ns. When the start of a new cycle is detected, the counter value is latched into the period register, and the counter is reset to zero. A 9×9 binary multiplier can be used to multiply the period register value by the slope value. Then a 16-bit adder can be used to add the offset value, resulting in a binary value that is approximately 256 times the voltage at the drain of the power transistor T3. In this manner, the voltage determination can be made using relatively few resources. For the voltage monitor 140 of FIG. 1, the voltage at the drain of the power transistor T3 is essentially measured directly and converted to a binary value with the ADC 145, considerably simplifying the voltage monitor circuitry.

6. Host Interface

There are various parameters, data, flags, settings, etc. that can be established with a controller 210 to interface with the precision supply circuits described above and camera 220. Some examples of such interfacing information are described below.

6.1 Configuration

At least some of the parameters in Table 1 and/or other protection parameters can be stored in the non-volatile memory of the controller 210 (such as a protection parameter register indicated by Table 2, though more or less information can be included in the register than listed in the tables). These parameters can be instantiated separately for each precision supply circuit in a system, while in cameras, only the flags, CVmin, and Cvmax parameters can be instantiated separately—the remaining parameters can be shared.

TABLE 1

NV Protection Parameters

| Parameter | Size | Units | Description |
|---|---|---|---|
| flags | 1 byte | NA | Configuration flags |
| Vslope | 1 byte | NA | Slope used in linear voltage interpolation |
| Voffset | 2 bytes | NA | Offset used in linear voltage interpolation |
| FETcooling | 2 bytes | mW | FET cooling power |
| FETthresh | 2 bytes | mJ × 4.194 | FET maximum energy limit |
| Cvmin | 1 byte | 0.5 V | Minimum compliance voltage |
| Cvmax | 1 byte | 0.5 V | Maximum compliance voltage |

TABLE 2

Protection Status Register

| Flag | Bit | Description |
|---|---|---|
| Sense | 0 | State of sense input |
| inhibitStrobing | 1 | Strobe output is deactivated due to . . . |
| noSenseInput | 2 | no signal on sense input |
| FETenergyLimit | 3 | FET energy threshold exceeded |
| lampEnergyLimit | 4 | lamp energy threshold exceeded |
| | 7..5 | Reserved |

Bits 1 . . . 0 of the flags parameter indicate what protection is incorporated into the precision supply circuit channel. Bit 2 of the flags parameter indicates whether the LampCooling and LampThresh values received by the device are encoded linearly (ranging to 65.535 watts and 274.877 joules, respectively) or exponentially (ranging to 1048 watts and 4,397,777 joules, respectively). Setting bit 3 indicates that the precision supply circuit supports an adjustable compliance rail, while setting bit 4 indicates if precision supply circuit information is included in the statistics packet (for cameras only). The remaining flags bits can be reserved. Table 3 provides an example of configuration flags, though more or fewer configuration flags can be included than listed in the table.

TABLE 3

Configuration flags

| Flag | Bit | Description |
|---|---|---|
| protection | 1..0 | 0 = no protection<br>1 = FET protection only<br>2 = FET and lamp protection<br>3 = reserved |
| encoding | 2 | 0 = linear<br>1 = exponential |
| adjCompRail | 3 | 1 = supports adjustable compliance rail (used prior to incorporation of compliance rail min/max) |
| includedInStats | 4 | 1 = alarm payload and actual strobe duration time values are included in stats packet |
| | 7..5 | Reserved |

In example cameras, the shared protection parameters (Vslope, Voffset, FETcooling, and FETthresh) begin at byte offset 199 of the configuration page, while the flag parameters (flags) can be stored at byte offset 206 for strobe controller 0 and byte offset 207 for strobe controller 1, and the Cvmin and Cvmax parameters can be stored at byte offset 208 and 210 for strobe controller 0 and 1, respectively.

6.2 Control

Certain device protection values can be set by the controller 210 through a write feature request to the precision supply circuit. The corresponding control parameters can be added at word offset 10 through 12 of the write feature request payload, as exemplified in Table 4, though more or less information can be included than listed in the table.

TABLE 4

Write Feature Payload

| Word | Field | Bits | Description |
|---|---|---|---|
| 0 | ISCnumber | 7..0 | Instance number |
| 0 | | 15..8 | Reserved |
| 1 | | 15..0 | Reserved |
| 2 | trigDefLo | 15..0 | Lo word of trigger definition |
| 3 | trigDefHi | 15..0 | Hi word of trigger definition |
| 4 | ISCmode | 7..0 | Mode register |
| 4 | | 15..8 | Flag register |
| 5 | ISCpwm | 7..0 | Strobe current PWM value |
| 5 | ISCvpwm | 15..8 | Strobe voltage PWM value |
| 6 | ISCdurationLo | 15..0 | ISC strobe duration LSW |
| 7 | ISCdurationHi | 7..0 | ISC strobe duration MSW |
| 7 | | 15..8 | Reserved |
| 8 | ISCoffTimeLo | 15..0 | ISC minimum off time LSW |
| 9 | ISCoffTimeHi | 7..0 | ISC minimum off time MSW |
| 9 | | 15..8 | Reserved |
| 10 | LampSupply | 15..0 | Lamp voltage (V × 256) |
| 11 | LampCooling | 15..0 | Lamp cooling power |
| 12 | LampThresh | 15..0 | Max lamp energy |
| 13..31 | | 15..0 | Reserved |

The LampCooling and LampThresh parameters can be encoded linearly or exponentially, depending on the configuration of the precision supply circuit. In the linear configuration, the LampCooling parameter can be represented in mW (for a range of 0 to 65.535 watts) and the LampThresh parameter can be represented in increments of 4.194303 mJ (for a range of 0 to 274.87371264 joules). In the exponential configuration, the top 2 bits can indicate the power, allowing for power values of ×1, ×4, ×16, and ×64. For example, a power value of ×64 will indicate the Lamp- Cooling parameter is represented in increments of 64 mW (for a range of 0 to 1048.512 watts) and the LampThresh parameter can be represented in increments of 268.435392 mJ (for a range of 0 to 4,397.778075648 joules).

In addition, bit 1 in the ISCmode register can be used to cause an alarm event from the precision supply circuit to be transmitted at the end of every current pulse to the load, not just when the LampThresh or FETthresh energy threshold has been exceeded. Bit 2 in the ISCmode register can be used to enable the lamp protection. Bit 3 in the ISCmode register can be used to activate the lamp for set-up purposes.

6.3 Status

The protection parameters and status can be read by the host controller 210 using a read feature request. Write feature parameters will be read from the same offsets they are assigned in the write feature payload. Non-volatile configuration parameters can be read using the non-volatile memory transfer read feature request. Additional data from the control circuitry can be included in word offsets 13 through 20 of a read feature request payload as indicated in Table 5, though more or less information can be included than listed in the table.

TABLE 5

Data for Read Feature Payload

| Word | Field | Bits | Description |
| --- | --- | --- | --- |
| 0 | ISCclipCnt | 15..0 | Clipped strobe count |
| 1 | ISCmissCnt | 15..0 | Missed strobe count |
| 2 | trigDefLo | 15..0 | Lo word of trigger definition |
| 3 | trigDefHi | 15..0 | Hi word of trigger definition |
| 4 | ISCmode | 7..0 | Mode register |
| 4 |  | 15..8 | Flag register |
| 5 | ISCpwm | 7..0 | Strobe current PWM value |
| 5 | ISCvpwm | 15..8 | Strobe voltage PWM value |
| 6 | ISCdurationLo | 15..0 | ISC strobe duration LSW |
| 7 | ISCdurationHi | 7..0 | ISC strobe duration MSB |
| 7 |  | 15..8 | Reserved |
| 8 | ISCoffTimeLo | 15..0 | ISC minimum off time LSW |
| 9 | ISCoffTimeHi | 7..0 | ISC minimum off time MSB |
| 9 |  | 15..8 | Reserved |
| 10 | lamp Supply | 15..0 | Lamp voltage (V × 256) |
| 11 | lampCooling | 15..0 | Lamp cooling power |
| 12 | lampThresh | 15..0 | Max lamp energy |
| 13 | FETpowerLo | 15..0 | Calculated instantaneous FET power LSW |
| 14 | FETpowerHi | 7..0 | Calculated instantaneous FET power MSB |
| 14 | pStatus | 15..8 | Protection status |
| 15 | lampPowerLo | 15..0 | Calculated instantaneous lamp power LSW |
| 16 | lampPowerHi | 7..0 | Calculated instantaneous lamp power MSB |
| 16 | sensePeriod | 15..8 | Measured period of voltage sensing input |
| 17 | FETenergyLo | 15..0 | Calculated FET energy LSW |
| 18 | FETenergyHi | 15..0 | Calculated FET power MSW |
| 19 | lampEnergyLo | 15..0 | Calculated lamp energy LSW |
| 20 | lampEnergyMid | 15..0 | Calculated lamp power SSW |
| 21 | lampEnergyHi | 15..0 | Calculated lamp power MSW |
| 22..31 |  | 15..0 | Reserved |

6.4 Alarms

In the event that a precision supply circuit is de-activated because an energy threshold is exceeded, notification in the form of an event packet can be transmitted by the precision supply circuit to the controller 210. For cameras, the event transmit port at index 2 (previously reserved) can be used to send the alarm event for a first precision supply circuit housed in the camera 220, and the event transmit port at index 3 (also previously reserved) can be used to send the alarm event for a second precision supply circuit housed in the camera 220. For some implementations, the event transmit port at index 14 can be used to send an alarm event. The target MAC(s), event ID, etc. can be determined by settings in the Txdescriptor for the assigned port. If no target MAC address is assigned, no event packet will be transmitted.

The alarm event payload can be defined as in Table 6, though more or less information can be included than listed in the table.

TABLE 6

Alarm Event Payload

| Dword | Field | Bits | Description |
| --- | --- | --- | --- |
| 0 | channelIndex | 7..0 | Strobe channel sourcing this event |
| 0 | pStatus | 15..8 | Protection status |
| 0 | FETpowerLo | 31..16 | Calculated instantaneous FET power LSW |
| 1 | FETpowerHi | 7..0 | Calculated instantaneous FET power MSB |
| 1 | lampPower | 31..8 | Calculated instantaneous lamp power |
| 2 | FETenergy | 31..0 | Calculated FET energy |
| 3 | lampEnergy | 31..0 | Calculated lamp energy |

The calculated near-instantaneous powers at the load 105 (e.g., LED lamp) and/or power transistors T3, T4 can be represented in units of 1 mW, though other units are possible and the units for the lamp and transistors can be different. The calculated energy for the load and/or power transistors can be represented in units of 64 nJ, though other units are possible and the units for the lamp and transistors can be different.

6.5 Statistics

Cameras with one or more internal, precision supply circuits can be configured to include information about the operation of the circuit(s) in a camera statistics packet. The statistics packet can be transmitted at the end of each image acquisition, for example, or after a sequence of image acquisitions. The statistics packet data can include at least some alarm event payload data, for example, as well as the pulse duration $t_p$ (on-time of T3 to conduct current through the load 105). An example of statistics packet data is shown in Table 7, though more or less information can be included in the packet than listed in the table.

TABLE 7

Statistics Packet Data

| Field | Bits | Description |
| --- | --- | --- |
| channelIndex | 7..0 | Strobe channel sourcing this event |
| pStatus | 15..8 | Protection status |
| FETpowerLo | 31..16 | Calculated instantaneous FET power LSW |
| FETpowerHi | 7..0 | Calculated instantaneous FET power MSB |
| lampPower | 31..8 | Calculated instantaneous lamp power |
| FETenergy | 31..0 | Calculated FET energy |
| lampEnergy | 31..0 | Calculated lamp energy |
| strobeDuration | 23..0 | Duration of ISC FET activation (in μm) |

The precision supply circuit 100, 400 and methods of operating the precision supply circuit can be implemented in various ways, some of which are listed below.

(1) A supply circuit (100) comprising: a transistor (T3) arranged to conduct current through a load (105); a feedback circuit (125) to apply a signal to the transistor (T3) to control an amplitude of the current conducted by the transistor, wherein the feedback circuit is configured to: receive a first feedback signal from a first sensing node (126) located in a first current path through which at least a first portion of the current flows when the current flows through the load, and receive a second feedback signal from a second sensing node (124) located in a second current path through which at least a second portion of the current flows when the current flows through the load and when an impedance (R16) between the first sensing node and the second sensing node is bypassed by the second current path.

(2) The supply circuit of configuration (1), wherein the feedback circuit comprises: an operational amplifier (120) to receive the first feedback signal and the second feedback signal; and a switch (114) to couple the first sensing node or the second sensing node to a first input terminal of the operational amplifier.

(3) The supply circuit of configuration (2) wherein the switch is a first switch, the supply circuit further comprising: a second switch (112) to couple a second input terminal of the operational amplifier to a first input (PWMI) configured to receive a pulse-width-modulated signal or a second input (108) arranged to provide a fixed voltage.

(4) The supply circuit of configuration (3), further comprising: a current source (133) coupled to the transistor, wherein the fixed voltage causes a standby current to flow through the transistor from the current source and negligible or no current to flow through the load.

(5) The supply circuit of configuration (2) or (3), wherein the impedance is a first impedance, the supply circuit further comprising: a second impedance (R18) connected in series with the first impedance and located between the second sensing node and a reference potential.

(6) The supply circuit of configuration (5), wherein the second impedance is smaller than the first impedance.

(7) The supply circuit of any one of configurations (1) through (6), wherein the feedback circuit controls the amplitude of the current to be constant to within 2% for not less than 85% of a pulse during which the current is conducted through the load by the transistor.

(8) The supply circuit of any one of configurations (1) through (7), wherein the transistor (T3) is a first transistor, the supply circuit further comprising: a second transistor (T4) configured in the second current path and configured to bypass the second portion of the current in the second current path.

(9) The supply circuit of any one of configurations (1) through (8), further comprising a programmable voltage source (170) to apply a voltage to the load.

(10) The supply circuit of configuration (9), wherein the programmable voltage source comprises a buck converter.

(11) The supply circuit of any one of configurations (1) through (10), further comprising a voltage monitor (140, 440) to detect a voltage at a drain or collector of the transistor.

(12) The supply circuit of configuration (11), wherein the voltage monitor comprises an analog-to-digital converter (145) to sample the voltage.

(13) The supply circuit of configuration (11), wherein the voltage monitor comprises voltage-to-frequency circuitry (442) and a timer (445) to detect the voltage.

(14) The supply circuit of configuration (11) in combination with a controller (210), wherein the controller is configured to repeatedly, for a sequence of sampling intervals; receive a signal from the voltage monitor indicative of the voltage at the drain or collector during a measurement interval that includes at least one sampling interval of the sequence of sampling intervals; compute a power delivered to the load during the measurement interval based, at least in part, on the received signal; and compute a power delivered to the transistor based, at least in part, on the received signal.

(15) The combination of configuration (14), wherein the controller is further configured to: accumulate a plurality of the computed powers delivered to the load to determine, at least in part, a current energy level of the load; compare the current energy level of the load against an energy limit for the load; and discontinue conducting current through the load by the transistor if the current energy level of the load exceeds the energy limit for the load.

(16) The combination of configuration (15), wherein determining the current energy level of the load includes accounting, by the controller, for a thermal power-dissipation rate of the load.

(17) A supply circuit (100) comprising: a first transistor (T3) arranged to conduct current through a load (105); a first resistor (R18) in a first circuit path through which at least a first portion of the current flows; a second resistor (R16) connected in series with the first resistor through which at least a second portion of the current flows when connected to the load; a second transistor (T4) arranged to shunt the current around the second resistor; and a feedback circuit (125) to receive a first feedback signal indicative of a first voltage dropped across the first resistor due to the first portion of the current when the second transistor shunts the current around the second resistor and to receive a second feedback signal indicative of a second voltage dropped across a combination of the first resistor and the second resistor due to the second portion of the current when the second transistor does not shunt the current around the second resistor.

(18) The supply circuit of configuration (17), wherein the feedback circuit comprises: an operational amplifier (120) to receive the first feedback signal from a first sensing node (124) at a terminal of the first resistor and the second feedback signal from a second sensing node at a terminal of the second resistor; and a switch (114) to couple the first sensing node or the second sensing node to a first input terminal of the operational amplifier.

(19) The supply circuit of configuration (18) wherein the switch is a first switch, the supply circuit further comprising: a second switch (112) to couple a second input terminal of the operational amplifier to a first input (PWMI) arranged to receive a pulse-width-modulated signal or a second input (108) arranged to provide a fixed voltage.

(20) The supply circuit of configuration (19), further comprising a current source (133) coupled to the transistor, wherein the fixed voltage causes a standby current to flow through the transistor from the current source and negligible or no current to flow through the load.

(21) The supply circuit of any one of configurations (17) through (20), wherein the second resistor is smaller than the first resistor.

(22) The supply circuit of any one of configurations (17) through (21), wherein the feedback circuit controls an amplitude of the current to be constant to within 2% for not less than 85% of a pulse during which the current is conducted through the load by the transistor.

(23) The supply circuit of any one of configurations (17) through (22), wherein the transistor (T3) is a first transistor, the supply circuit further comprising: a second transistor (T4) configured in the second current path and configured to bypass the second portion of the current in the second current path.

(24) The supply circuit of any one of configurations (17) through (23), further comprising a programmable voltage source (170) to apply a voltage to the load.

(25) The supply circuit of any one of configurations (17) through (24), further comprising a voltage monitor (140, 440) to detect a voltage at a drain or collector of the transistor.

(26) The supply circuit of any one of configurations (17) through (25) in combination with a controller (210), wherein the controller is configured to repeatedly, for a sequence of sampling intervals: receive a signal from the voltage monitor indicative of the voltage at the drain or collector during a measurement interval that includes at least one sampling interval of the sequence of sampling intervals; compute a power delivered to the load during the measurement interval based, at least in part, on the received signal; and compute a power delivered to the transistor based, at least in part, on the received signal.

(27) The combination of configuration (26), wherein the controller is further configured to: accumulate a plurality of the computed powers delivered to the load to determine, at least in part, a current energy level of the load; and compare the current energy level of the load against an energy limit for the load; and discontinue conducting current through the load by the transistor if the current energy level of the load exceeds the energy limit for the load.

(28) A method of conducting a current through a load, the method comprising: receiving, at a control terminal of a transistor (T3) in a supply circuit, a signal that causes the transistor to conduct the current through a load (105); controlling, with a feedback circuit (125) in the supply circuit and coupled to the transistor (T3), an amplitude of the current conducted by the transistor; receiving in the feedback circuit a first feedback signal from a first sensing node (126) located in a first current path through which at least a first portion of the current flows; receiving in the feedback circuit a second feedback signal from a second sensing node (124) located in a second current path through which at least a second portion of the current flows; and directing the second portion of the current around an impedance (R16) connected between the first sensing node and the second sensing node when receiving the second feedback signal.

(29) The method of (28), wherein the feedback circuit includes an operational amplifier (120) and a switch (114), the method further comprising: receiving the first feedback signal or the second feedback signal at a first input terminal of the operational amplifier; coupling, with the switch, the first sensing node to the first input terminal to receive the first feedback signal; and coupling, with the switch, the second sensing node to the first input terminal to receive the second feedback signal.

(30) The method of (29), wherein the switch is a first switch, the method further comprising: coupling, with a second switch (112), a second input terminal of the operational amplifier to a first input (PWMI) of the supply circuit that is configured to receive a pulse-width-modulated signal; and coupling, with the second switch (112), the second input terminal of the operational amplifier to a second input (108) arranged to provide a fixed voltage.

(31) The method of (30), further comprising: delivering, with a current source (133), a standby current to flow through the transistor in response to coupling the second input terminal of the operational amplifier to the second input, such that negligible or no current flows through the load.

(32) The method of any one of (28) through (31), further comprising: controlling, with the feedback circuit, the amplitude of the current to be constant to within 2% for not less than 85% of a pulse during which the current is conducted through the load by the transistor.

(33) The method of any one of (28) through (32), wherein the transistor (T3) is a first transistor, the method further comprising: bypassing, with a second transistor (T4) configured in the second current path, the second portion of the current in the second current path.

(34) The method of any one of (28) through (33), further comprising: detecting, with a voltage monitor (140, 440), a voltage at a drain or collector of the transistor.

(35) The method of any one of (28) through (31), further comprising: receiving, with a controller that is communicatively coupled to the supply circuit, a signal from the voltage monitor indicative of the voltage at the drain or collector during a measurement interval that includes at least one sampling interval of a sequence of sampling intervals; computing, with the controller, a power delivered to the load during the measurement interval based, at least in part, on the received signal; and computing, with the controller, a power delivered to the transistor based, at least in part, on the received signal.

(36) The method of (35), further comprising: accumulating, with the controller, a plurality of the computed powers delivered to the load to determine, at least in part, a current energy level of the load; comparing, with the controller, the current energy level of the load against an energy limit for the load; and issuing a command to from the controller to the supply circuit to discontinue conduction of the current through the load by the transistor if the current energy level of the load exceeds the energy limit for the load.

(37) The method of (36), further comprising: accounting, by the controller, for a thermal power-dissipation rate of the load when determining the current energy level of the load.

(38) A camera (220) comprising: a housing (221); an imaging array (222) to acquire images, the imaging array mounted in the housing; a supply circuit (100, 400) mounted in the housing to conduct a pulse of current through a load (105) that generates light so as to illuminate an object (230) imaged by the imaging array during an image-acquisition period of the imaging array, the image-acquisition period comprising an interval of time during which one frame of image data is captured by the imaging array, wherein the supply circuit comprises: a transistor (T3) arranged to conduct current through a load (105); a feedback circuit (125) to apply a signal to the transistor (T3) to control an amplitude of the current conducted by the transistor, wherein the feedback circuit is configured to: receive a first feedback signal from a first sensing node (126) located in a first current path through which at least a first portion of the current flows when the current flows through the load, and receive a second feedback signal from a second sensing node (124) located in a second current path through which at least a second portion of the current flows when the current flows through the load and when an impedance (R16) between the first sensing node and the second sensing node is bypassed by the second current path.

(39) The camera of configuration (38), further comprising: a mount (224) to receive a lens assembly; a first connector (228) coupled to the housing to communicatively couple to a controller; and a second connector (227) coupled to the housing to connect to the load.

(40) The camera of configuration (39), wherein the first connector receives power-over-ethernet.

(41) The camera of configuration (38) or (39), wherein the housing has a maximum edge dimension no larger than 50 mm.

(42) The camera of any one of configurations (38) through (41), wherein the feedback circuit comprises: an operational amplifier (120) to receive the first feedback signal and the second feedback signal; and a switch (114) to couple the first sensing node or the second sensing node to a first input terminal of the operational amplifier.

(43) The camera of configuration (42) wherein the switch is a first switch, the supply circuit further comprising: a second switch (112) to couple a second input terminal of the operational amplifier to a first input (PWMI) configured to receive a pulse-width-modulated signal or a second input (108) arranged to provide a fixed voltage.

(44) The camera of configuration (43), further comprising: a current source (133) coupled to the transistor, wherein the fixed voltage causes a standby current to flow through the transistor from the current source and negligible or no current to flow through the load.

(45) The camera of any one of configurations (38) through (44), wherein the impedance is a first impedance, the supply circuit further comprising: a second impedance (R18) connected in series with the first impedance and located between the second sensing node and a reference potential.

(46) The camera of configuration (45), wherein the second impedance is smaller than the first impedance.

(47) The camera of any one of configurations (38) through (46), wherein the feedback circuit controls the amplitude of the current to be constant to within 2% for not less than 85% of a pulse during which the current is conducted through the load by the transistor.

(48) The camera of any one of configurations (38) through (47), wherein the transistor (T3) is a first transistor, the supply circuit further comprising: a second transistor (T4) configured in the second current path and configured to bypass the second portion of the current in the second current path.

(49) The camera of any one of configurations (38) through (48), further comprising a programmable voltage source (170) to apply a voltage to the load.

(50) The camera of any one of configurations (38) through (49), further comprising a voltage monitor (140, 440) to detect a voltage at a drain or collector of the transistor.

(51) The camera of configuration (50) in combination with a controller (210), wherein the controller is configured to repeatedly, for a sequence of sampling intervals: receive a signal from the voltage monitor indicative of the voltage at the drain or collector during a measurement interval that includes at least one sampling interval of the sequence of sampling intervals; compute a power delivered to the load during the measurement interval based, at least in part, on the received signal; and compute a power delivered to the transistor based, at least in part, on the received signal.

(52) The combination of configuration (51), wherein the controller is further configured to: accumulate a plurality of the computed powers delivered to the load to determine, at least in part, a current energy level of the load; compare the current energy level of the load against an energy limit for the load; and discontinue conducting current through the load by the transistor if the current energy level of the load exceeds the energy limit for the load.

(53) A method of operating a camera, the method comprising: receiving, at a control terminal of a transistor (T3) in a supply circuit, a signal that causes the transistor to conduct a pulse of current through a load (105); controlling, with a feedback circuit (125) coupled to the transistor (T3), an amplitude of the pulse of current conducted by the transistor; receiving in the feedback circuit a first feedback signal from a first sensing node (126) located in a first current path through which at least a first portion of the pulse of current flows; receiving in the feedback circuit a second feedback signal from a second sensing node (124) located in a second current path through which at least a second portion of the pulse of current flows; directing the second portion of the pulse of current around an impedance (R16) connected between the first sensing node and the second sensing node when receiving the second feedback signal; and acquiring a frame of image data of an object with an imaging array of the camera while the pulse of current is conducted through the load.

(54) The method of (53), further comprising: biasing the transistor in a ready state after conducting the pulse of current through the load; providing a standby current to the transistor from a current source (133) while the transistor is in the ready state, such that negligible or no current flows through the load while the transistor is in the ready state.

(55) The method of (53) or (54), wherein the feedback circuit includes an operational amplifier (120) and a switch (114), the method further comprising: receiving the first feedback signal or the second feedback signal at a first input terminal of the operational amplifier; coupling, with the switch, the first sensing node to the first input terminal to receive the first feedback signal; and coupling, with the switch, the second sensing node to the first input terminal to receive the second feedback signal.

(56) The method of (55), wherein the switch is a first switch, the method further comprising: coupling, with a second switch (112), a second input terminal of the operational amplifier to a first input (PWMI) of the supply circuit that is configured to receive a pulse-width-modulated signal; and coupling, with the second switch (112), the second input terminal of the operational amplifier to a second input (108) arranged to provide a fixed voltage.

(57) The method of any one of (53) through (56), further comprising: controlling, with the feedback circuit, the amplitude of the pulse of current to be constant to within 2% for not less than 85% of a pulse during which the pulse of current is conducted through the load by the transistor.

(58) The method of any one of (53) through (57), wherein the transistor (T3) is a first transistor, the method further comprising: bypassing, with a second transistor (T4) configured in the second current path, the second portion of the pulse of current in the second current path.

(59) The method of any one of (53) through (58), further comprising detecting, with a voltage monitor (140, 440), a voltage at a drain or collector of the transistor.

(60) The method of (59), further comprising: receiving, with a controller that is communicatively coupled to the supply circuit, a signal from the voltage monitor indicative of the voltage at the drain or collector during a measurement interval that includes at least one sampling interval of a sequence of sampling intervals; computing, with the controller, a power delivered to the load during the measurement interval based, at least in part, on the received signal; and computing, with the controller, a power delivered to the transistor based, at least in part, on the received signal.

(61) The method of (60), further comprising: accumulating, with the controller, a plurality of the computed powers delivered to the load to determine, at least in part, a current energy level of the load; comparing, with the controller, the current energy level of the load against an energy limit for the load; and issuing a command to from the controller to the supply circuit to discontinue conduction of the pulse of current through the load by the transistor if the current energy level of the load exceeds the energy limit for the load.

(62) The method of (61), further comprising accounting, by the controller, for a thermal power-dissipation rate of the load when determining the current energy level of the load.

7. Conclusion

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A supply circuit comprising:
   a transistor arranged to conduct current through a load;
   a feedback circuit to apply a signal to the transistor to control an amplitude of the current conducted by the transistor, wherein the feedback circuit is configured to:
      receive a first feedback signal from a first sensing node located in a first current path through which at least a first portion of the current flows when the current flows through the load, and
      receive a second feedback signal from a second sensing node located in a second current path through which at least a second portion of the current flows when the current flows through the load and when an impedance between the first sensing node and the second sensing node is bypassed by the second current path.

2. The supply circuit of claim 1, wherein the feedback circuit comprises:
   an operational amplifier to receive the first feedback signal and the second feedback signal; and
   a switch to couple the first sensing node or the second sensing node to a first input terminal of the operational amplifier.

3. The supply circuit of claim 2 wherein the switch is a first switch, the supply circuit further comprising:

a second switch to couple a second input terminal of the operational amplifier to a first input (PWMI) configured to receive a pulse-width-modulated signal or a second input arranged to provide a fixed voltage.

4. The supply circuit of claim 3, further comprising:
a current source coupled to the transistor, wherein the fixed voltage causes a standby current to flow through the transistor from the current source and negligible or no current to flow through the load.

5. The supply circuit of claim 2, wherein the impedance is a first impedance, the supply circuit further comprising:
a second impedance connected in series with the first impedance and located between the second sensing node and a reference potential.

6. The supply circuit of claim 5, wherein the second impedance is smaller than the first impedance.

7. The supply circuit of claim 1, wherein the feedback circuit controls the amplitude of the current to be constant to within 2% for not less than 85% of a pulse during which the current is conducted through the load by the transistor.

8. The supply circuit of claim 1, wherein the transistor is a first transistor, the supply circuit further comprising:
a second transistor configured in the second current path and configured to bypass the second portion of the current in the second current path.

9. The supply circuit of claim 1, further comprising:
a programmable voltage source to apply a voltage to the load.

10. The supply circuit of claim 9, wherein the programmable voltage source comprises a buck converter.

11. The supply circuit of claim 1, further comprising:
a voltage monitor to detect a voltage at a drain or collector of the transistor.

12. The supply circuit of claim 11, wherein the voltage monitor comprises an analog-to-digital converter to sample the voltage.

13. The supply circuit of claim 11, wherein the voltage monitor comprises voltage-to-frequency circuitry and a timer to detect the voltage.

14. The supply circuit of claim 11 in combination with a controller, wherein the controller is configured to repeatedly, for a sequence of sampling intervals:
receive a signal from the voltage monitor indicative of the voltage at the drain or collector during a measurement interval that includes at least one sampling interval of the sequence of sampling intervals;
compute a power delivered to the load during the measurement interval based, at least in part, on the received signal; and
compute a power delivered to the transistor based, at least in part, on the received signal.

15. The combination of claim 14, wherein the controller is further configured to:
accumulate a plurality of the computed powers delivered to the load to determine, at least in part, a current energy level of the load;
compare the current energy level of the load against an energy limit for the load; and
discontinue conducting current through the load by the transistor if the current energy level of the load exceeds the energy limit for the load.

16. The combination of claim 15, wherein determining the current energy level of the load includes accounting, by the controller, for a thermal power-dissipation rate of the load.

17. A camera comprising:
a housing;
an imaging array to acquire images, the imaging array mounted in the housing;
a supply circuit mounted in the housing to conduct a pulse of current through a load that generates light so as to illuminate an object imaged by the imaging array during an image-acquisition period of the imaging array, the image-acquisition period comprising an interval of time during which one frame of image data is captured by the imaging array, wherein the supply circuit comprises:
a transistor arranged to conduct current through a load;
a feedback circuit to apply a signal to the transistor to control an amplitude of the current conducted by the transistor, wherein the feedback circuit is configured to:
receive a first feedback signal from a first sensing node located in a first current path through which at least a first portion of the current flows when the current flows through the load, and
receive a second feedback signal from a second sensing node located in a second current path through which at least a second portion of the current flows when the current flows through the load and when an impedance between the first sensing node and the second sensing node is bypassed by the second current path.

18. The camera of claim 17, further comprising:
a mount to receive a lens assembly;
a first connector coupled to the housing to communicatively couple to a controller; and
a second connector coupled to the housing to connect to the load.

19. The camera of claim 18, wherein the first connector receives power-over-ethernet.

20. The camera of claim 17, wherein the housing has a maximum edge dimension no larger than 50 mm.

21. The camera of claim 17, wherein the feedback circuit comprises:
an operational amplifier to receive the first feedback signal and the second feedback signal; and
a switch to couple the first sensing node or the second sensing node to a first input terminal of the operational amplifier.

22. The camera of claim 21 wherein the switch is a first switch, the supply circuit further comprising:
a second switch to couple a second input terminal of the operational amplifier to a first input (PWMI) configured to receive a pulse-width-modulated signal or a second input arranged to provide a fixed voltage.

23. The camera of claim 22, further comprising:
a current source coupled to the transistor, wherein the fixed voltage causes a standby current to flow through the transistor from the current source and negligible or no current to flow through the load.

24. The camera of claim 17, wherein the impedance is a first impedance, the supply circuit further comprising:
a second impedance connected in series with the first impedance and located between the second sensing node and a reference potential.

25. The camera of claim 24, wherein the second impedance is smaller than the first impedance.

26. The camera of claim 17, wherein the feedback circuit controls the amplitude of the current to be constant to within 2% for not less than 85% of a pulse during which the current is conducted through the load by the transistor.

27. The camera of claim 17, wherein the transistor is a first transistor, the supply circuit further comprising:

a second transistor configured in the second current path and configured to bypass the second portion of the current in the second current path.

28. The camera of claim 17, further comprising:
a programmable voltage source to apply a voltage to the load.

29. The camera of claim 17, further comprising:
a voltage monitor to detect a voltage at a drain or collector of the transistor.

30. The camera of claim 29 in combination with a controller, wherein the controller is configured to repeatedly, for a sequence of sampling intervals:
receive a signal from the voltage monitor indicative of the voltage at the drain or collector during a measurement interval that includes at least one sampling interval of the sequence of sampling intervals;
compute a power delivered to the load during the measurement interval based, at least in part, on the received signal; and
compute a power delivered to the transistor based, at least in part, on the received signal.

31. The combination of claim 30, wherein the controller is further configured to:
accumulate a plurality of the computed powers delivered to the load to determine, at least in part, a current energy level of the load;
compare the current energy level of the load against an energy limit for the load; and
discontinue conducting current through the load by the transistor if the current energy level of the load exceeds the energy limit for the load.

* * * * *